United States Patent [19]

Nachev et al.

[11] 4,417,127
[45] Nov. 22, 1983

[54] METHOD AND APPARATUS FOR SEAM TRACKING IN ARC WELDING

[75] Inventors: Georgi N. Nachev; Angel S. Angelov; Boryan I. Petkov, all of Sofia, Bulgaria

[73] Assignee: Institute Po Technicheska Kibernetika I Robotika, Sofia, Bulgaria

[21] Appl. No.: 254,095

[22] Filed: Apr. 14, 1981

[30] Foreign Application Priority Data

May 19, 1980 [BG] Bulgaria .................................. 47828
Jul. 11, 1980 [BG] Bulgaria .................................. 48465

[51] Int. Cl.³ .................................................. B23K 9/12
[52] U.S. Cl. ............................... 219/124.34; 250/202; 318/577
[58] Field of Search ................... 219/124.34, 124.02, 219/124.22; 318/577; 250/202; 228/8, 9

[56] References Cited

U.S. PATENT DOCUMENTS

| 3,135,857 | 6/1964 | Voros | 250/202 |
|---|---|---|---|
| 3,268,805 | 8/1966 | Normando | 219/124.34 |
| 3,370,151 | 2/1968 | Normando | 219/124.34 |
| 3,757,125 | 9/1973 | Okada et al. | 219/124.34 |
| 4,124,792 | 11/1978 | Flora et al. | 219/124.34 |
| 4,198,164 | 4/1980 | Cantor | 250/202 |
| 4,328,416 | 5/1982 | Dudley et al. | 250/202 |

FOREIGN PATENT DOCUMENTS

| 2421191 | 1/1975 | Fed. Rep. of Germany . |
| 2711660 | 9/1978 | Fed. Rep. of Germany . |
| 52-56043 | 5/1977 | Japan | 219/124.34 |
| 221872 | 9/1968 | U.S.S.R. | 219/124.34 |
| 650749 | 3/1979 | U.S.S.R. | 219/124.34 |

Primary Examiner—C. C. Shaw
Attorney, Agent, or Firm—Karl F. Ross

[57] ABSTRACT

In order to track a distinctive line on a workpiece area to be followed by an operating implement, specifically a junction line between two workpieces to be welded by a torch advancing along that line, a narrow beam is trained generally perpendicularly from a pulsating source of luminous radiation—e. g. a laser—upon that area and is shifted parallel to itself around the implement so as to intersect the workpiece area along a closed trace substantially bisected by the line being tracked. The source of radiation is part of a photosensor including an objective with an optical axis inclined to the beam at a small angle to generate an image of the latter on a slanting straight line parallel to a central ray which passes through the point of intersection of the beam axis with the front focal plane of the objective, this image line starting at the intersection of the rear focal plane with a central ray parallel to the beam. A linear photoreceiver on the slanting line registers the locations of images of scanning points illuminated by the beam, the spacing of these locations from the start of the image line being inversely proportional to the distance of an illuminated scanning point from the aforementioned point of intersection on the front focal plane. Plotting these distances against angle of rotation from a reference position yields a curve with discontinuities at or close to crossover points between the beam trace and the junction line being tracked.

12 Claims, 4 Drawing Figures

METHOD AND APPARATUS FOR SEAM TRACKING IN ARC WELDING

FIELD OF THE INVENTION

Our present invention relates to a method and an apparatus for guiding an operating implement along a distinctive tracking line of a workpiece surface, especially for seam tracking in arc welding with industrial robots and other automatons under electronic control.

BACKGROUND OF THE INVENTION

In a known method of weld-seam tracking (see German laid-open application No. 24 21 191) a probe or sensor, disposed ahead of a welding torch, measures the relative positon of the torch and the two workpieces to be welded whereupon the line of their contact, i.e. the zone of the weld seam, is calculated.

A drawback of this method lies in that in the case of a change of the configuration of the weld seam or in the inclination of the torch it is necessary to change also the position of the position sensor. Moreover, the method can be applied only in the case of angle joints or when workpieces with beveled edges are to be welded. Another drawback lies in that the correct guiding of the position sensor requires it to have at least one additional degree of mobility with respect to the welding torch.

Another method of weld-seam tracking is known (see German laid-open application No. 27 11 660) according to which the zone immediately around the welding spot is scanned by a television camera. Thus, there is obtained a two-dimensional image profile in the zone of the weld seam or close to it; the point through which the welding torch must pass is identified by known mathematical methods.

A drawback of this method lies in that the information received is not sufficient to ensure a sound weld seam, since it comes from a two-dimensional profile. Moreover, complex mechanical and electronic assemblies are used in the zone near the arc; this greatly reduces the reliability of the welding equipment.

There are further known seam tracking systems which measure the distance to the closely juxtaposed workpieces by the use of inductive, capacitive, microwave, pneumatic and other types of sensor.

A drawback of these systems lies in that the range of measurement is limited to several millimeters and their use in welding is rendered difficult because of the necessity to arrange them in the immediate vicinity of the arc where the temperature is high, molten metal is splashing continuously and be electromagnetic interferences are strong.

Still further known distance-measuring systems comprise interferometers using microwave, laser or other electromagnetic emissions to achieve a high accuracy of measurement.

A drawback of these latter systems as regards their utility for measuring the relative position of the torch and the workpieces to be welded lies in that, when a beam of electromagnetic energy passes from one workpiece to the other, there can occur a loss of signal which would disturb their operation.

Also known are systems for determining the position of the workpieces by means of a television camera giving an image of the weld zone from which definite geometric information can be derived. Such systems have the aforementioned drawback of necessitating a positioning of the camera in the vicinity of the arc, thereby exposing it to the harmful influences of the welding process. Moreover, the extraction of geometric information requires very complex logical computing devices with large memory, which makes them very expensive for practical purposes. Since the camera is disposed near the torch, the access of the latter to some types of seams is rendered difficult which limits the capacity of the welding machine, robot or automaton to produce such seams.

OBJECTS OF THE INVENTION

It is therefore the object of our invention to provide a method and an apparatus for the purpose described, especially for seam tracking, which can be used with any type of joint configuration for scanning the zone next to the welding spot in a manner producing a three-dimensional image, thus making it possible to determine the direction in which the welding touch should move and thereby ensuring a high quality of the welded seam.

SUMMARY OF THE INVENTION

This object is achieved, in accordance with our present invention, by training a narrow beam of luminous radiation—usually in a generally perpendicular direction—upon a workpiece area provided with a distinctive tracking line along which work is to be performed by an operating implement guided along that line, specifically a welding torch advancing along a junction of two workpiece surfaces, and shifting the beam—e.g. parallel to itself—around the operating implement to illuminate the workpiece area along a trace swept by the beam which intersects the tracking line at two crossover points forwardly and rearwardly of that implement. When the latter is a torch, the rearward crossover point will lie on a weld seam already formed. Rays from the illuminated trace are gathered by an objective of such focal length that its front and rear focal planes are both well spaced from the workpiece area, the optical axis of this objective including a small angle with the beam. As the objective moves jointly with the source of radiant energy emitting the beam, images of illuminated points of its trace are focused by that objective upon a segment of a straight line slantingly intersecting its rear focal plane. Deviations of the operating implement from the tracking line are determined on the basis of the locations of discontinuities of a curve interconnecting the images of the illuminated points of the beam trace which represent the aforementioned crossover points.

An arc-welding apparatus emobdying our invention comprises a movable carrier supported on a welding torch advancing along a junction line of two closely juxtaposed workpieces on which a weld seam is to be formed, the carrier being rotatable about the torch axis which may be generally perpendicular to the adjoining workpiece surfaces, and drive means on the torch for rotating the carrier. A source of radiant energy, forming part of sensing means on the carrier, generates the aforementioned narrow beam which has a predetermined orientation relative to the torch axis and sweeps the workpiece surfaces along the trace referred to above. The distances of a multiplicity of points of that trace from a reference point along the beam are determined from an image thereof, with the aid of radiation-receiving means also forming part of the sensing means, and define a curve with discontinuities corresponding to the crossover points whose angular positions relative to a reference position can thus be readily ascertained.

Pursuant to a more particular feature of our invention, the radiation-receiving means of our apparatus comprises the objective already mentioned and a linear photoreceiver disposed rearwardly of its rear focal plane upon which the image of the beam trace is focused. The photoreceiver, for reasons explained hereinafter, should extend along a segment of the slanting line referred to above; this line starts at a point of intersection of the rear focal plane with a central ray parallel to the beam axis and is parallel to a central ray passing through a point of intersection of the beam axis with the front focal plane.

The source of radiant energy may be an emitter of luminous radiation, such as a high-power laser, generating a multiplicity of scanning pulses in the course of a revolution of the support means about the torch axis. This divides the beam trace on the workpiece surface or surfaces into a number of discrete scanning points giving rise to respective image points unequivocally associated therewith on the slanting line segment. The beam may rotate slowly in proximity to the junction line of the workpieces and at an increased speed in the remaining portion of its path, with light pulses emitted at uniform time intervals, or at constant speed while the recurrence rate of the pulses is increased in the vicinity of the junction line.

The advantages of our present invention are:

A three-dimensional image of the entire surroundings of the welding spot is obtained; this makes it possible to determine the direction of movement of the torch.

The measurement of distances to points disposed on all sides of the welding torch yields information also on the shape of the seam already produced; this makes it possible to adjust the process parameters so as to obtain a weld seam of uniform quality along its whole length.

Moreover, when the welding torch nears spots where the direction of the junction line changes significantly (angles, for example), the method allows a proper adjustment of the future path, regardless of its previous direction. This leads to a considerable reduction of the resetting time of the welding system and increases its operating efficiency.

Since a practically continuous scanning around the torch is performed, it is possible upon an approach of accidental obstacles to receive a timely signal for stopping the torch movement in the dangerous direction. This increases considerably the overall reliability of the equipment.

The information which can be received by this method is so rich that it permits a widening of the "intellectual" possibilities of industrial welding robots at a negligible increase of their price, thus considerably enlarging their field of use.

If the optical system of the seam-tracking apparatus is properly designed, the apparatus itself can be disposed far enough from the zone of welding, e.g. in the base of the torch, where the danger of damage by droplets of molten metal, metal vapors and other harmful discharges of the welding arc are minimized.

BRIEF DESCRIPTION OF THE DRAWING

For a better understanding of our invention, reference should be made to the accompanying drawing which illustrates a preferred embodiment and wherein.

SPECIFIC DESCRIPTION

Figure 3:
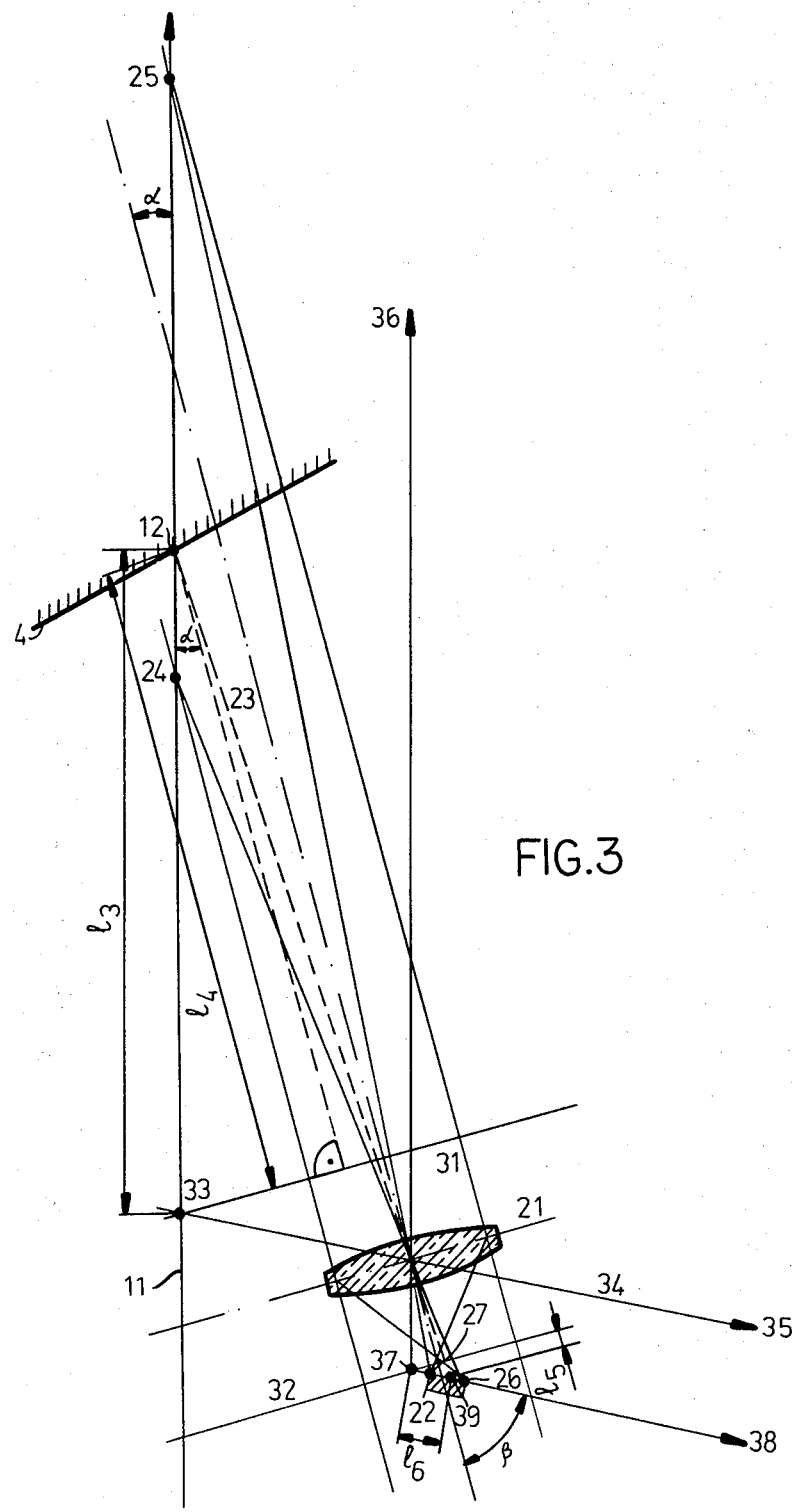
FIG. 3 diagrammatically shows a preferred embodiment of the optical system of FIG. 2.

In the drawing we have shown a movable welding torch 1 comprising a contact nozzle 2 and an electrode wire 3. Two workpieces 4 are being welded by an arc 5 producing a weld seam 6. On a support 7, fastened to the torch 1, there is disposed a rotating carrier 8 driven by a motor 9 which is fixedly secured to the welding torch 1. Onto the movable carrier 8 there is fixed a photosensor 10 measuring distance by means of a pulsating light beam 11. A multiplicity of scanning points 12 on the surfaces of the juxtaposed workpieces 4 are successively illuminated by the beam 11 sweeping these surfaces along a trace 13 in the form of a closed curve which is substantially bisected by the junction line of the workpieces. The beam trace 13 intersects that junction line at two crossover points, namely at an apex point 14 forwardly of welding electrode 3 and a rearward point 15 lying on the weld seam. At 16 we have indicated the direction of the zero radius-vector of the coordinate system of the torch 1 established by a pin or lug 17 projecting radially from torch body at a distance $l_0$ from a reference point 33 (FIG. 3) which is smaller than the minimum distance $l_1$ of that point from the surfaces of the workpieces 4. At r we have shown the radius-vector in a given position of beam 17 (here aligned with point 15) spaced by an angle $\phi$ from zero position 16.

Figure 2:
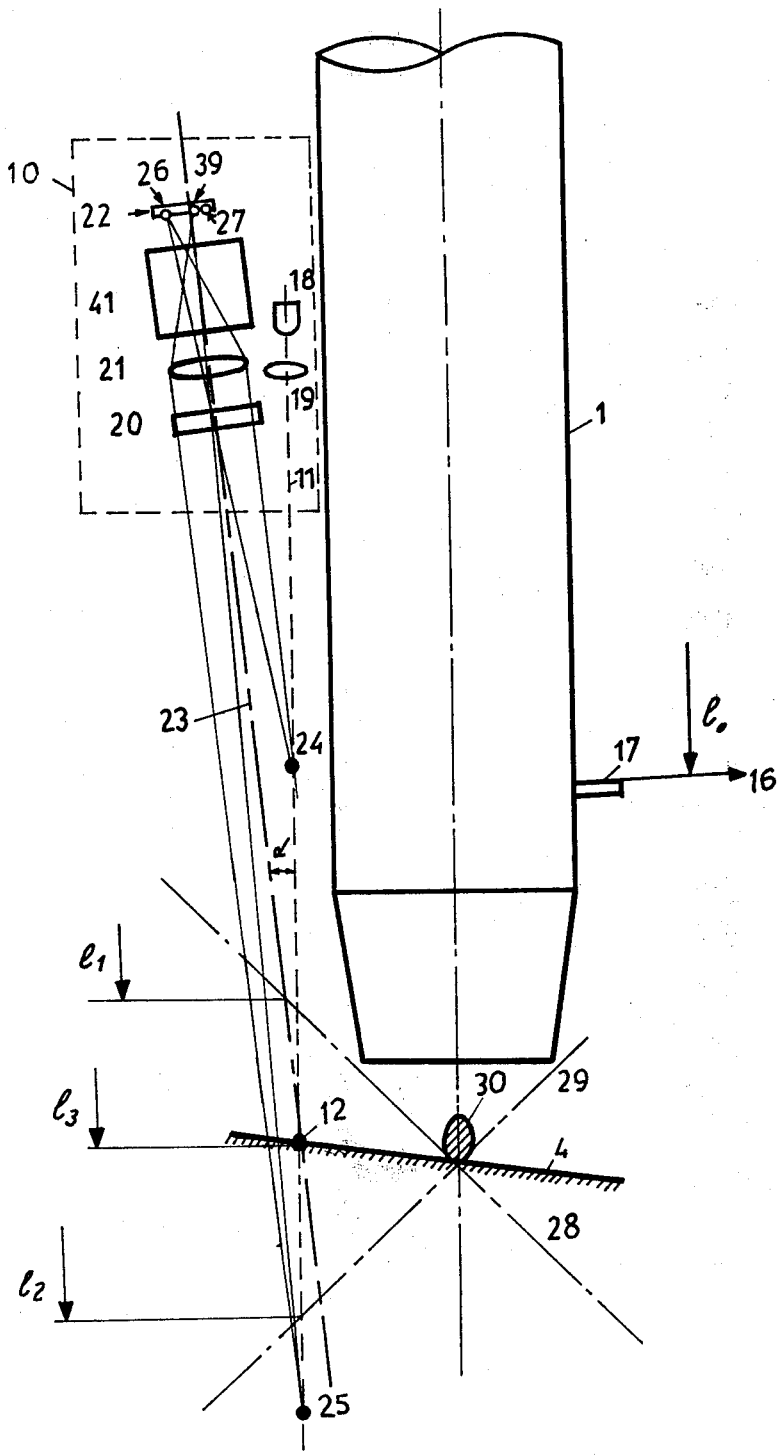
FIG. 2 diagrammatically shows the disposition of the optical system of the apparatus illustrated in FIG. 1 with respect to a welding torch.

The distance sensor 10 comprises a pulse-type light source 18 (see FIG. 2) and an optical objective 19 coaxial therewith as well as a light filter 20 of suitable spectral characteristic in line with another optical objective 21 and a linear photoreceiver 22, the optical axis 23 of objective 21 including a small angle $\alpha$ with the axis of the measuring beam 11 emitted by the light source 18. The field of view of objective 21 is so chosen that all points of the axis of the narrow measuring beam 11, within a portion thereof lying between the boundary points 24 and 25 (see FIG. 3) defining the range of measurement of the sensor 10, have an image of the linear photoreceiver 22. By measuring the position of such an image 39 on the linear photoreceiver 22, it is possible to determine the distance of a given scanning point 12 from the reference point 33. Numerals 26 and 27 denote the images of the boundary points 24 and 25 on the photoreceiver 22. When a workpiece surface lies in a limiting plane 28 or 29 tangent to the torch 1, the intersection of that plane with beam 11 at a distance $_2$ from the reference point closely approaches the boundary point 25; the boundary point 24 must be spaced from the reference point by less than the distance $l_0$ to the pint 17 by which the zero radius-vector 16 is indicated. Numeral 30 denotes the zone in which a weld seam 6 can be produced, i.e. where the arc 5 can burn. Numerals 31 and 32 respectively designate the front and rear focal planes of the objective 21 shown in FIG. 3; reference point 33 is the intersection of the measuring beam 11 with the front focal plane 31. A ray 34 traversing the center of objective 21 indicates the direction of an infinitely remote image 35 of point 33; another central ray 36 parallel to measuring beam 11 indicates the direction of the infinitely remote point of that beam whose image lies on the rear focal plane 32 of the objective 21. A line 38 extends in a direction parallel to all the rays from remote point 35 focused upon intersection point 33 by the objective 21. According to our invention, in order to achieve an optimum focusing of the points scanned by the beam 11, the linear photoreceiver 22 must lie on this slanting line 38.

The image 39 of any of the successive scanning points 12 between the points 24 and 25, i.e. in the range of distance measurement, is projected in an unequivocal manner onto the linear photoreceiver 22. The fixed distance $l_0$ to the pin 17 gives an easily distinguishable pulse 40, FIG. 4, corresponding to the reference position defined by the zero radius-vector 16. We may add to the optical system of the sensor 10 a device with controllable light transmissivity 41 (a Kerr shutter, for example) which operates synchronously with the pulse emitter 18.

Figure 4:
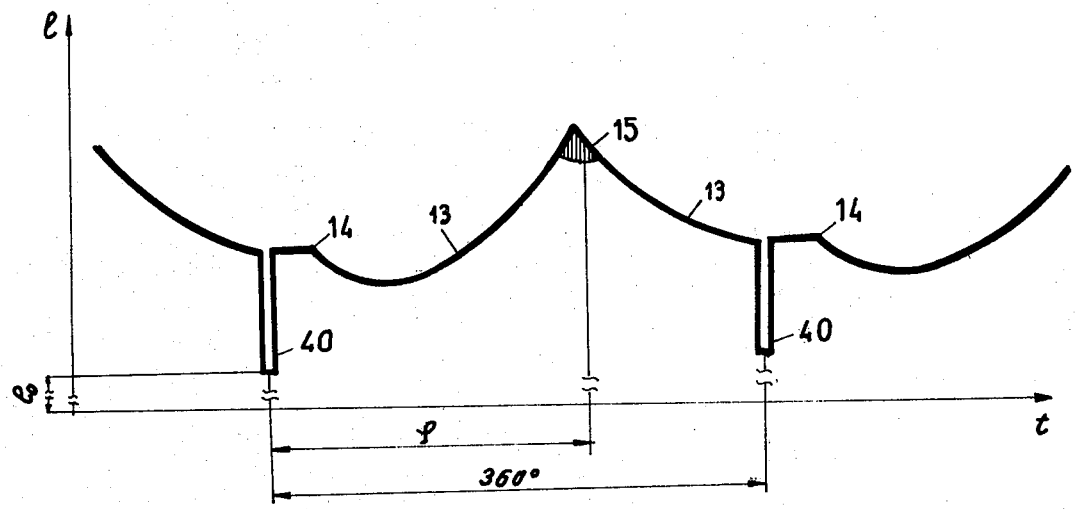
FIG. 4 is a graphical illustration of the envelope of distance-measuring signals generated by our improved seam-tracking apparatus.

The shape of the signal from the distance sensor 10, illustrated by way of example in FIG. 4, shows that, when passing through an apex point 14, the curve 13 changes abruptly its character. In the case of other configurations of the workpiece 4, the distance can change stepwise, and when approaching the end of the workpiece it can project beyond the range of operation of the distance sensor 10. On the opposite side of the torch 1, where the weld seam is already formed, the shape of the signal yielding the curve 13 plotted in FIG. 4 will have a second discontinuity, corresponding to crossover point 15, which can be similar to that of apex point 14 or can differ therefrom by representing an image of the weld seam as also indicated in FIG. 4. Obviously, this image can help in judging the shape of the already accomplished weld.

Figure 1:
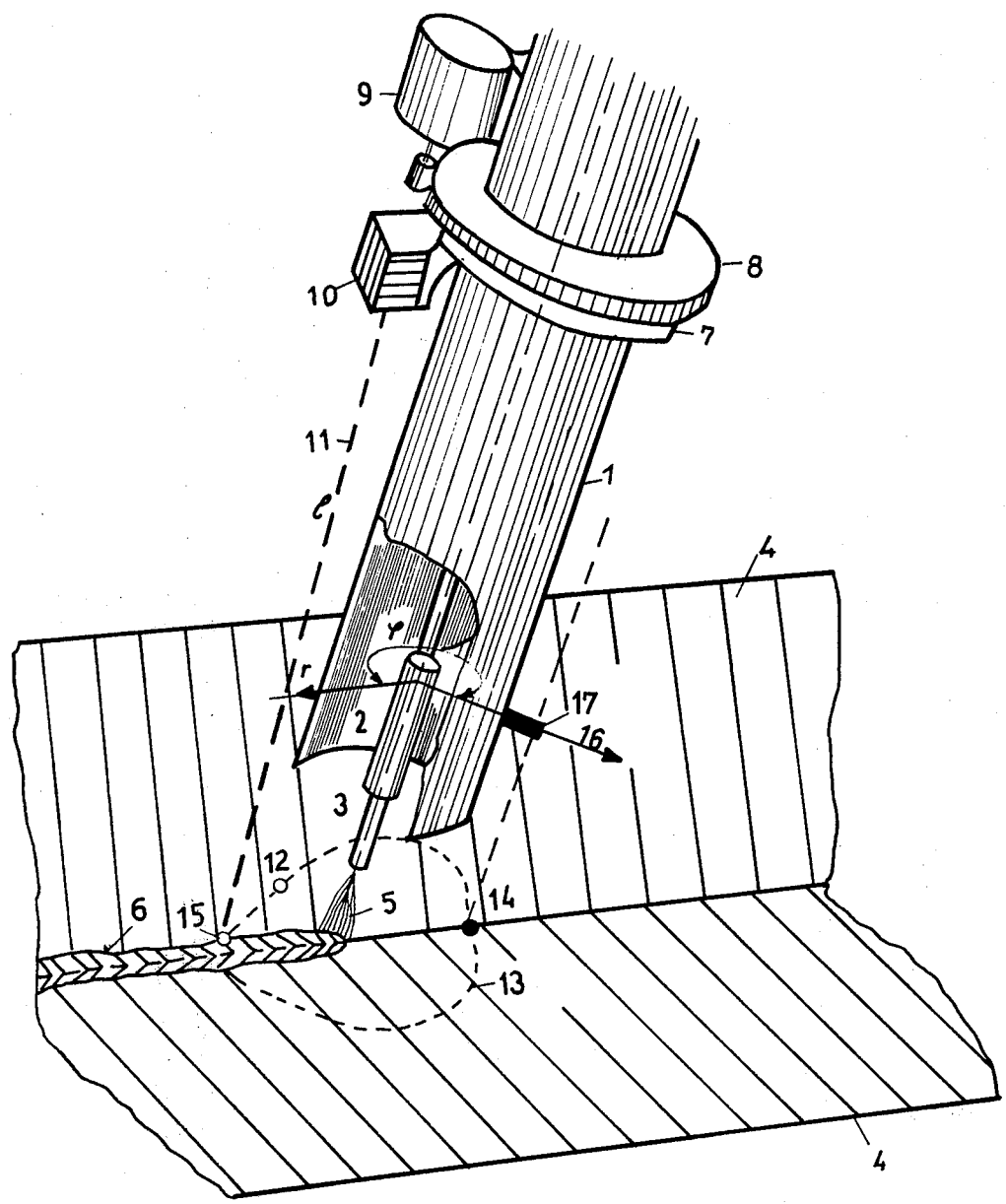
FIG. 1 is a partially cut-away perspective view of a seam-tracking apparatus according to our invention.

When the distance sensor 10 rotates continuously around the welding torch 1, its beam 11 measures successively the distances to both workpieces 4. In FIG. 1 the measuring beam 11 describes a cylindrical surface intersecting the workpiece surfaces along the curve 13. The measuring beam 11 can also describe a conical surface; this depends on the mounting of the distance sensor 10 on the carrier 8.

Since the position of sensor 10 in the coordinate system of the welding torch 1 is always known (e.g. from an angle sensor or with motor 9 designed as a stepping drive), the information received after one revolution of the distance sensor 10 around the torch 1 enables the relative position of the torch 1 and the workpieces 4 to be determined.

Thus, our invention facilitates a measurement of the distances of surface points of the workpieces 4 from reference point 33 in corresponding scanning position of beam 11, a determination of the equations of the workpiece surfaces, as well as a calculation of their junction line. By comparing the calculated position of the crossover points 14 and 15 with the actual measurement, it is possible to increase the reliability, i.e. to eliminate erroneous measurement of distances due to droplets of solidified metal adhering to the surfaces of the workpieces 4, for example. For this purpose it is sufficient to use mathematical methods known per se from analytical geometry.

The direction of movement of the welding torch 1 can be ascertained directly from a determination of the angle of the apex point 14 with respect to the zero radius-vector 16. In the case of complex curves, the positions of the apex point 14 determined in consecutive beam rays must be stored in a suitable memory and the torch 1 must move so as to pass over them in succession. Since the distance $l_0$ to the pin 17 is much smaller than the distances to the surface points 12 of the workpieces 4, any passage of the measuring beam 11 across the pin 17 produces a clearly distinguishable pulse 40 as noted above. If necessary, this pulse can also be used for calibration of the distance sensor 10 if its physical structure is subject to influence of temperature, atmospheric humidity and other factors. The optical sensor 10 here described does not exhaust the possibilities of implementing our method for seam tracking since the latter can also be practiced by the use of other types of radiation, e.g. microwaves.

The information received from rotational scanning of the workpiece surfaces can also be used for determining a number of other parameters besides the deviation of the torch 1 from the line of the seam 6. For example, it is easy to determine from the ratio of the distances to the two crossover points 14 and 15 the angle between the torch 1 and the direction of the weld seam 6. The relative distances to the closest points of the two workpiece surfaces indicate any deviation of the torch 1 from their junction line. If the workpieces 4 are beveled, it is possible to measure successively the extent of this beveling and to adjust correspondingly the conditions of welding (current, arc voltage and speed of movement along the seam) so that a sufficient filling of the seam 6 with metal is achieved. The situation is similar in the case of any variation of the separation of the workpieces, e.g. the appearance of a gap between their confronting edges or the presence of an inserted spacer in the case of a very wide clearance therebetween. All this permits the development of industrial robots and welding automatons of very high intelligence which can react to considerable deviations in the geometry of the seam from its presumed shape.

To measure the distance to a point 12 on the surface of either workpiece 4, the pulse emitter 18 illuminates that point with beam 11. The objective 21 focuses the resulting light spot on the linear photoreceiver 22. Thanks to the properties of the latter, the identification of the position of an image point 39 on its surface is no problem, and when the angle $\alpha$ between the measuring beam 11 and the optical axis 23 of objective 21 along with other characteristic parameters of the geometry of the sensor are known, it is possible to determine the distance to the lighted point 12. We may use as the photoreceiver 22 a conventional linear matrix or any other device which permits the identification of the position of the lighted point 39 thereon. The spectral sensitivity of the photoreceiver 22, in combination with the spectral characteristics of the filter 20 and the pulse emitter 18, should be so chosen that the light of the welding arc 5 does not disturb the measurement. A number of known devices meet this requirement, particularly those operating in the near-infrared range where the emission of the arc strongly decreases in power. For an additional reduction of the influence of background lighting from the welding arc 5 and the heating of the workpieces 4, we prefer to include in the optical system of the photoreceiver 22 the aforementioned Kerr shutter 41 which is unblanked synchronously with the pulse emitter 18.

By a suitable relative arrangement of the emitter 18 and the photoreceiver 22, specifically of the optical axes of their respective systems, it is possible to make the measuring range of workpieces 4 (between points 24 and 25 in FIG. 2) equal to or greater than the zone where these components can in reality be disposed (between the boundary lines 28 and 29 along which the torch is tangent to the workpiece surface). The distance between the images 26 and 27 of the points 24 and 25 on the linear photoreceiver 22 must be smaller than the length of the photoreceiver 22 itself. This enables a scanning of any surface point of each workpiece, regardless of its position with respect to zone 30 where welding can be carried out.

Since line 38 is parallel to the central ray 34 passing through reference point 33, it intersects that ray at the infinitely remote point 35 which is the image of point 33 projected by objective 21. With central ray 36 intersecting the axis of beam 11 at infinity, the intersection 37 of ray 36 with the rear focal plane 32 at point 37 is the image of the infinitely distant end of the beam axis. Thus, line 38 is the locus of the imges of all points of beam 11 from point 33 on to infinity, including the range limits 24 and 25 respectively imaged at 26 and 27.

With intersection 33 assumed to be the zero or reference point for the reading of distance along the measuring beam 11, the actual distance between a given scanning point 12 (FIG. 3) and the front focal plane 31 is $l_4 = l_3 \cdot \cos \alpha$, where $\alpha$ is the above-identified angle between beam 11 and the optical axis 23 while $l_3$ is the distance between points 33 and 12. The image 39 of point 12 lies on the straight line 38 at a distance from the rear focal plane 32 which is given by $l_5 = f^2/l_4$, where f is the focal length of objective 21. Furthermore, $l_5 = l_6 \cdot \cos \beta$, where $\beta$ is the angle between the straight line 38 and the optical axis 23 while $l_6$ is the distance between points 37 and 39. It follows from these relationships that the distance $l_6$ is equal to $f^2/l_3 \cdot \cos \alpha \cos \beta$, being thus inversely proportional to the distance $l_3$ to be measured.

Since in the optical system the angles $\alpha$ and $\beta$ as well as the focal length f are constant values, it is obvious that to each scanning point 12 illuminated by the measuring beam 11 there corresponds an image point 39 of the line segment 26–27 where the photoreceiver 22 is disposed. The fact that the images of the scanning points of beam segment 24–25 are always in focus on the photoreceiver 22 is a prerequisite for accurate measurement.

From FIG. 4, where the calculated scanning-point distances l have been plotted against time t and angle of rotation $\phi$ (assuming a constant rotary speed), it will be apparent that the seam-crossing point 15 is to lie midway between successive discontinuities representing the periodic crossing of the junction line of workpieces 4 by the illuminated trace 13 at the apex point 14. In the embodiment specifically described, the distinctiveness of the junction line needed to produce these discontinuities is given by a relative inclination of the two workpiece surfaces as will be apparent from FIG. 1. Since, however, the location of the apex point 14 is not precisely known in advance and therefore might not coincide with a scanning point 12, the proximity of the discontinuity of the plotted curve 13 to the actual apex point depends on the pulse frequency of beam 11.

Our diclosed method and apparatus for seam tracking in arc welding by scanning surface points of closely juxtaposed workpieces can also be used in robots which effect other processing operations, such as assembly, cleaning of castings, or application and removal of coatings, as well as in measuring machines.

We claim:

1. A method of guiding an operating implement along a distinctive tracking line on a workpiece area, comprising the steps of:
   (a) training a narrow beam of luminous radiation upon said workpiece area in the vicinity of said operating implement;
   (b) shifting said beam around said operating implement to illuminate said workpiece area along a trace intersecting said tracking line at two crossover points forwardly and rearwardly of said operating implement;
   (c) gathering rays from the illuminated trace by an objective with front and rear focal planes spaced from said workpiece area and with an optical axis including a small angle with said beam, said objective moving jointly with said beam for focusing images of illuminated scanning points of said trace upon a segment of a straight line slantingly intersecting said rear focal plane;
   (d) detecting discontinuities in a curve interconnecting the images of said scanning points, said discontinuities representing said crossover points; and
   (e) determining deviations of said operating implement from said tracking line on the basis of the locations of said discontinuities on said segment.

2. A method as defined in claim 1 wherein said beam is pulsed to produce a multiplicity of discrete scanning points on said workpiece area giving rise to respective image points on said segment.

3. A method as defined in claim 1 wherein said beam and said objective are rotated about said operating implement in consecutive revolutions to form a closed trace substantially bisected by said tracking line.

4. A method of guiding a welding torch along a junction line of two closely juxtaposed workpieces to be arc-welded to each other, comprising the steps of:
   (a) training a narrow beam of luminous radiation upon adjoining surfaces of said workpieces in the vicinity of said welding torch;
   (b) shifting said beam around said welding torch to illuminate said surfaces along a trace intersecting said junction line at two crossover points forwardly and rearwardly of said welding torch, the rearward crossover point lying on a weld seam formed by the advancing torch;
   (c) gathering rays from the illuminated trace by an objective with front and rear focal planes spaced from the workpiece surfaces and with an optical axis including a small angle with said beam, said objective moving jointly with said beam for focusing images of illuminated scanning points of said trace upon a segment of a straight line slantingly intersecting said rear focal plane;
   (d) detecting discontinuities in a curve interconnecting the images of said scanning points, said discontinuities representing said crossover points; and
   (e) determining deviations of said welding torch from said junction line on the basis of the locations of said discontinuities on said segment.

5. A method as defined in claim 4 wherein said beam is pulsed to produce a multiplicity of discrete scanning points on said workpiece surfaces giving rise to respective image points on said segment.

6. A method as defined in claim 4 wherein said beam and said objective are rotated about said welding torch in consecutive revolutions to form a closed trace substantially bisected by said junction line.

7. A method as defined in claim 4 wherein said workpiece surfaces are relatively inclined at said junction line.

8. An apparatus for tracking a junction line of two closely juxtaposed workpieces to be arc-welded to each other along said junction line, comprising:

a welding torch movable for advancement along said junction line and formation of a weld seam thereon, said torch having an axis trained upon adjoining surfaces of said workpieces;

a carrier on said torch rotatable about the axis thereof;

drive means on said torch for rotating said carrier about the torch axis; and sensing means on said carrier including a source of radiant energy in the form of a narrow beam trainable upon the workpiece surfaces with a predetermined orientation relative to the torch axis for sweeping said surfaces along a trace intersecting said junction line at a first crossover point forwardly of the advancing torch and intersecting an already formed weld seam at a second crossover point rearwardly of the advancing torch, said sensing means further including radiation-receiving means for determining from an image of said trace the distances of a multiplicity of points thereof from a reference point along said beam, said distances defining a curve with discontinuities representing said first and second crossover points.

9. An apparatus as defined in claim 8 wherein said source is an emitter of luminous radiation, said radiation-receiving means comprising an objective with front and rear focal planes spaced from the workpiece surfaces and with an optical axis including a small angle with the axis of said beam, said radiation-receiving means further comprising a linear photoreceiver disposed rearwardly of said rear focal plane for having a linear image of said trace focused thereon by said objective.

10. An apparatus as defined in claim 9 wherein said photoreceiver extends along a segment of a straight line starting at a point of intersection of a central ray parallel to the beam axis with said rear focal plane, said straight line being parallel to a central ray passing through a point of intersection of the beam axis with said front focal plane.

11. An apparatus as defined in claim 9 wherein said source is a generator of a multiplicity of scanning pulses occurring in the course of a revolution of said support means about the torch axis.

12. An apparatus as defined in claim 11, further comprising a device of controllable light transmissivity interposed between said objective and said photoreceiver, said device being operable in synchronism with the generation of said scanning pulses.

* * * * *